(12) United States Patent
Bremser

(10) Patent No.: US 6,737,468 B1
(45) Date of Patent: May 18, 2004

(54) BASE COAT AND ITS USE FOR PRODUCING COLOR AND/OR EFFECT-PRODUCING BASE COATINGS AND MULTI-LAYER COATINGS

(75) Inventor: Wolfgang Bremser, Münster (DE)

(73) Assignee: BASF Coatings AG, Munster (DE)

(*) Notice: Subject to any disclaimer, the term of this patent is extended or adjusted under 35 U.S.C. 154(b) by 126 days.

(21) Appl. No.: 10/018,351

(22) PCT Filed: Jun. 30, 2000

(86) PCT No.: PCT/EP00/06108

§ 371 (c)(1),
(2), (4) Date: Jan. 11, 2002

(87) PCT Pub. No.: WO01/02499

PCT Pub. Date: Jan. 11, 2001

(30) Foreign Application Priority Data

Jul. 2, 1999 (DE) .......................... 199 30 665

(51) Int. Cl.⁷ .......................... C08L 41/00; C08L 43/00
(52) U.S. Cl. .................. 524/547; 524/431; 524/543; 524/548; 524/551; 524/553; 524/555; 524/556; 524/558; 524/560; 524/561; 524/563; 524/564; 524/565; 524/567; 524/570; 524/577
(58) Field of Search .................. 524/804, 805, 524/806, 812, 817, 819, 832, 833, 543, 544, 547, 551, 553, 555, 556, 558, 460, 560, 561, 563, 564, 565, 548, 567, 570, 577, 431

(56) References Cited

U.S. PATENT DOCUMENTS

| | | | | |
|---|---|---|---|---|
| 3,552,986 A | * | 1/1971 | Bassemir et al. ........... | 427/500 |
| 3,577,475 A | * | 5/1971 | Gurney et al. ............. | 585/482 |
| 4,085,168 A | | 4/1978 | Milkovich et al. ......... | 260/886 |
| 4,413,036 A | | 11/1983 | Drexler et al. ............ | 428/458 |
| 4,521,580 A | | 6/1985 | Turner et al. .............. | 526/307 |
| 4,533,701 A | | 8/1985 | Kusumoto et al. ......... | 525/370 |
| 4,636,545 A | | 1/1987 | König et al. ............... | 524/457 |
| 4,656,226 A | | 4/1987 | Hutchins et al. ........... | 525/93 |
| 4,677,003 A | | 6/1987 | Redlich et al. ............. | 427/373 |
| 5,047,454 A | | 9/1991 | Cowles et al. ............. | 523/500 |
| 5,126,393 A | | 6/1992 | Blum et al. ................ | 524/538 |
| 5,322,715 A | | 6/1994 | Jouck et al. ............... | 427/409 |
| 5,385,996 A | | 1/1995 | Rizzardo et al. ........... | 526/240 |
| 5,395,903 A | | 3/1995 | Charmot et al. ........... | 526/220 |
| 5,516,559 A | | 5/1996 | Röckrath et al. ........... | 427/407 |
| 5,521,229 A | | 5/1996 | Lu et al. .................... | 522/40 |
| 5,565,508 A | | 10/1996 | Hoenel et al. .............. | 523/414 |
| 5,601,880 A | | 2/1997 | Schwarte et al. ........... | 427/407.1 |
| 5,670,557 A | | 9/1997 | Dietz et al. ................ | 522/184 |
| 5,773,543 A | | 6/1998 | Rizzardo et al. ........... | 526/215 |
| 5,830,927 A | | 11/1998 | Vanderhoff et al. ........ | 522/81 |
| 5,830,928 A | | 11/1998 | Falerf et al. ............... | 523/502 |
| 5,840,372 A | | 11/1998 | Rink et al. ................. | 427/407.1 |
| 5,854,353 A | | 12/1998 | Knoll et al. ................ | 525/314 |
| 5,857,998 A | | 1/1999 | Barry ........................ | 604/96 |

(List continued on next page.)

FOREIGN PATENT DOCUMENTS

| | | | |
|---|---|---|---|
| CA | 2004988 | 12/1989 | ........... C08F/2/24 |
| CA | 2103595 | 1/1992 | ........... C08F/2/38 |
| CA | 2086156 | 12/1992 | ......... C09D/175/04 |
| CA | 2127919 | 7/1994 | ........... C08L/57/00 |
| CA | 2181934 | 7/1996 | ......... C08F/282/00 |
| CA | 2259559 | 3/1997 | ........... C08F/8/34 |
| CA | 2205030 | 9/1997 | ........... C08F/2/38 |
| DE | 35 46 594 | 12/1992 | ......... C08F/212/06 |
| EP | 3582221 | 9/1989 | ........... C09D/5/44 |
| EP | 401565 | 5/1990 | ........... C09D/5/02 |
| EP | 498583 | 1/1992 | ........... B01J/19/18 |
| EP | 732359 | 3/1996 | ........... C08K/5/00 |
| EP | 755946 | 7/1996 | ........... C08F/2/22 |
| EP | WO 97/31031 | 8/1997 | |
| WO | WO9106535 | 5/1991 | ......... C07C/409/16 |
| WO | WO9213903 | 8/1992 | ........... C08F/2/38 |
| WO | WO9222355 | 12/1992 | ........... A63B/37/12 |
| WO | WO9322351 | 11/1993 | ........... C08F/2/42 |
| WO | WO9801478 | 1/1998 | ........... C98F/2/38 |
| WO | WO9837104 | 8/1998 | ........... C08F/2/48 |
| WO | WO9910413 | 3/1999 | ........... C08J/3/00 |
| WO | WO9915597 | 4/1999 | ......... C09D/133/00 |

OTHER PUBLICATIONS

Bartol, et al., 091263,426, Mar. 5, 1999.
Rink et al., 09/830,694, filed Apr. 27, 2003.
Meiseuburg, et al., 09/926,532, filed Nov. 16, 2001.
Mangels, et al., 10/088,376, filed Mar. 11, 2002.
Nickolaus et al., 10/250,586, filed Jul. 2, 2003.
Ramesh, et al., 10/455,066, filed Jun. 5, 2003.
Baumgart, et al., 10/049,656, filed Feb. 13, 2002.
Rink, et al., 10/049,607, filed Feb. 14, 2002.
Nickolaus et al., 10/250,694, Jul. 3, 2003.
Bendix et al., 10/148,428, May 29, 2002.

(List continued on next page.)

Primary Examiner—Judy M. Reddick

(57) ABSTRACT

The use of a copolymer (A) preparable by free-radical polymerization of a) at least one olefinically unsaturated monomer and
b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, in an aqueous medium, in a basecoat material used to produce color and/or effect basecoats BL and multicoat color and/or effect coating systems ML.

8 Claims, No Drawings

U.S. PATENT DOCUMENTS

| | | | |
|---|---|---|---|
| 5,859,112 A | 1/1999 | Overbeck et al. | 524/460 |
| 5,905,132 A | 5/1999 | Wegner et al. | 528/45 |
| 5,959,026 A | 9/1999 | Abusleme et al. | 524/758 |
| 5,969,030 A | 10/1999 | Grandhee | 524/457 |
| 5,972,809 A | 10/1999 | Faler et al. | 442/103 |
| 5,990,221 A | 11/1999 | Dames et al. | 524/457 |
| 6,020,438 A | 2/2000 | Lubnin et al. | 525/317 |
| 6,046,259 A | 4/2000 | Das et al. | 524/40 |
| 6,140,386 A | 10/2000 | Vanderhoff et al. | 522/78 |
| 6,160,049 A | 12/2000 | Mathauer et al. | 524/804 |
| 6,162,886 A | 12/2000 | Bremer et al. | 526/318.42 |
| 6,221,949 B1 | 4/2001 | Gross et al. | 524/451 |
| 6,235,857 B1 | 5/2001 | Rizzardo et al. | 526/220 |
| 6,346,591 B1 | 2/2002 | Ohrbom et al. | 526/312 |
| 6,403,709 B2 | 6/2002 | Ramesh et al. | 525/95 |
| 6,503,983 B1 | 1/2003 | Morrison et al. | 524/804 |
| 6,506,836 B1 | 1/2003 | Bremser et al. | 525/64 |
| 6,534,588 B1 | 3/2003 | Löcken et al. | 524/591 |
| 6,566,476 B2 | 5/2003 | Ohrbom et al. | 526/312 |
| 2002/0035289 A1 | 3/2002 | Walter et al. | 560/157 |
| 2002/0086966 A1 | 7/2002 | Weise et al. | 526/312 |
| 2002/0103319 A1 | 8/2002 | Ohrbom et al. | 526/312 |
| 2002/0132921 A1 | 9/2002 | Ramesh et al. | 525/88 |
| 2003/0078337 A1 | 4/2003 | Bremser et al. | 524/502 |
| 2003/0091832 A1 | 5/2003 | Ohrbom et al. | 428/423.1 |
| 2003/0100673 A1 | 5/2003 | Bendix et al. | 524/801 |
| 2003/0143414 A1 | 7/2003 | Bendix et al. | 428/500 |

OTHER PUBLICATIONS

Clauss, 10/148,295, filed May 29, 2002.
Bremser, 10/018,703, filed Dec. 13, 2001.
Bremser, 10/018,352, filed Dec. 7, 2001.
Bremser, 10/018,350, filed Dec. 7, 2001.
Bendix et al., 10/148,427, filed May 29, 2002.
Derwent Accession No. 1996–056019, English Abstract for JP07316242, Dec. 5, 1995.
Derwent Accession No. 1999–502399, English Abstract for JP11217409, Aug. 10, 1999.
English Abstract for, Dalibor, DE 3546594, filed Dec. 10, 1987.
English Abstract for Grutter, EP 358 221, filed Mar. 14, 1990.
English Abstract for Knoll, et al., EP 732 359, filed Sep. 18, 1996.
English Abstract for Sapper, EP WO 99/15597, filed Apr. 1, 1999.
Derwent Publications Ltd. London, GB; Klasse A17, AN 1986–152526 & JP 61 085417 A.
(Nippon Petrochemicals Co Ltd), May 1, 1986.
Derwent Publications Ltd. London, GB; Klasse A13, AN 1996–094214 & JP 08 003208 A, (Nippon Steel Chem Co), Jan. 9, 1996.

* cited by examiner

BASE COAT AND ITS USE FOR PRODUCING COLOR AND/OR EFFECT-PRODUCING BASE COATINGS AND MULTI-LAYER COATINGS

This application is a National Phase Application of Patent Application PCT/EP00/06108 filed on Jun. 30, 2000.

The present invention relates to a novel basecoat material, in particular an aqueous basecoat material. The present invention further relates to a process for preparing the novel basecoat material. The present invention additionally relates to the use of the novel basecoat material to produce color and/or effect basecoats and multicoat color and/or effect coating systems, especially for motor vehicles. The present invention relates, furthermore, to novel basecoats and multicoat systems and to the primed or unprimed substrates coated therewith, especially motor vehicle bodies.

Basecoat materials, especially aqueous basecoat materials, comprising acrylate copolymers as binders are known from the patent DE-A-39 42 804. The acrylate copolymers are prepared by two-stage emulsion polymerization. The basecoat materials possess a high level of storage stability. The basecoats produced with them have a good metallic effect, good adhesion to the surfacer coat and to the clearcoat, good gloss, and good resistance under the constant condensation conditions of DIN 50017.

The patents WO 99/15597 or DE-A-197 41 554 likewise disclose aqueous basecoat materials which comprise at least one acrylate copolymer based on from 30 to 60% by weight of $C_1$–$C_8$ alkyl (meth)acrylate monomers, from 30 to 60% by weight of vinylaromatic monomers and from 0.5 to 10% by weight of (meth)acrylic acid, at least one nonassociative thickener, which contains at least one acrylate copolymer based on $C_1$–$C_6$ alkyl (meth)acrylate and (meth)acrylic acid, and at least one further poly(meth)acrylate resin which contains at least one reactive group for isocyanates. The aqueous basecoat films do not form cracks during the drying process and are highly compatible with powder clearcoat materials or powder slurry clearcoat materials.

The known basecoat materials may be used in accordance with the wet-on-wet technique, which is employed with preference in automotive OEM finishing; i.e., the basecoat materials are applied to a primed or unprimed substrate to give a basecoat film which, however, is not cured but instead is only initially dried and overcoated with a clearcoat film, after which the two films are jointly cured.

Basecoat materials, especially aqueous basecoat materials, thus have numerous advantages which render them attractive for industrial utilization.

The acrylate copolymers themselves may be prepared by well-known polymerization techniques in bulk, solution or emulsion. Polymerization techniques for preparing acrylate copolymers, especially polyacrylate resins, are general knowledge and are widely described (cf., e.g., Houben-Weyl, Methoden der organischen Chemie, 4th Edition, Volume 14/1, pages 24 to 255 (1961)).

Further examples of suitable copolymerization techniques for preparing acrylate copolymers are described in patents DE-A-197 09 465, DE-C-197 09 476, DE-A-28 48 906, DE-A-195 24 182, EP-A-0 554 783, EP-B-0 650 979, WO 95/27742, DE-A-38 41 540, and WO 82/02387.

Suitable reactors for the copolymerization processes are the customary and known stirred vessels, cascades of stirred vessels, tube reactors, loop reactors, and Taylor reactors, as described for example in patents DE-B-1 071 241 and EP-A-0 498 583 or in the article by K. Kataoka in Chemical Engineering Science, Volume 50, No. 9, 1995, 1409 to 1416.

The free-radical polymerization used to prepare the acrylate copolymers, however, is often very exothermic and difficult to control. The implications of this fact for the reaction regime are that it is necessary to avoid high monomer concentrations and/or the batch mode, where the entirety of the monomers is introduced as an initial charge in an aqueous medium, emulsified and subsequently polymerized to completion. Even the tailoring of defined molecular weights, molecular weight distributions, and other properties frequently causes difficulties. The tailoring of a certain profile of properties in the acrylate copolymers, however, is of great importance for their use as binders in basecoat materials, especially aqueous basecoat materials, since by this means it is possible to influence the profile of performance properties of the basecoat materials in a direct way.

There has therefore been no lack of attempts to control the free-radical copolymerization of olefinically unsaturated monomers.

For instance, International Patent Application WO 98/01478 describes a process in which the copolymerization is conducted in the presence of a free-radical initiator and of a thiocarbonylthio compound as chain transfer agent.

International Patent Application WO 92/13903 describes a process for preparing copolymers having a low molecular weight by means of free-radical chain polymerization in the presence of a group transfer agent containing a carbon-sulfur double bond. These compounds act not only as chain transfer agents but also as growth regulators, so that only low molecular weight copolymers result.

International Patent Application WO 96/15157 discloses a process for preparing copolymers having a comparatively narrow molecular weight distribution, in which a monomer is reacted with a vinyl-terminated macromonomer in the presence of a free-radical initiator.

Furthermore, International Patent Application WO 98/37104 discloses the preparation of acrylate copolymers having defined molecular weights by means of free-radical polymerization in the presence of a chain transfer agent containing a C—C double bond and containing radicals which activate this double bond in terms of the free-radical addition reaction of monomers.

Despite the significant process in this area, there is still a lack of a universally applicable process of controlled free-radical polymerization which in a simple manner provides chemically structured polymers, especially acrylate copolymers, and by means of which it is possible to tailor the profile of properties of the polymers in respect of their use in basecoat materials, especially aqueous basecoat materials, which are used to produce color and/or effect basecoats and multicoat color and/or effect coating systems.

It is an object of the present invention to provide new basecoat materials, especially aqueous basecoat materials, which are outstandingly suitable for producing color and/or effect basecoats and multicoat color and/or effect coating systems and as an advantageous alternative to the conventional basecoat materials. A further object of the present invention is to propose new processes for preparing the basecoat materials, permitting their profile of properties to be varied in a simple way and to be adapted precisely to the profiles of properties of the other coats of the multicoat systems. The aim is to realize these objects in a simple manner by tailoring the profile of properties of the basecoat materials, in particular through the use of chemically structured polymers obtainable by means of controlled free-radical polymerization. The new multicoat color and/or effect coating systems which result with the aid of these new basecoat materials should possess at least the good profile of properties of the known multicoat systems, and in fact should preferably exceed them. In particular, they are intended to possess outstanding optical quality, intercoat adhesion and condensation resistance and to exhibit no cracking (mud cracking), flow defects or surface structures. Moreover, these chemically structured polymers ought to be suitable for use as grinding resins, making it possible advantageously to prepare pigment pastes which can be incorporated particularly well by mixing, for the surfacers, basecoat materials and clearcoat materials used to produce the new multicoat color and/or effect coating systems.

Accordingly, we have found the novel use of a copolymer (A) in a basecoat material, especially an aqueous basecoat material, which is used to produce color and/or effect basecoats and multicoat color and/or effect coating systems, where the copolymer (A) is preparable by free-radical polymerization of a) at least one olefinically unsaturated monomer and b) at least one olefinically unsaturated monomer different than the olefinically unsaturated monomer (a) and of the general formula I

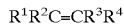
$$R^1R^2C=CR^3R^4 \qquad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium. In the text below, the novel use of the copolymer (A) is referred to as "use in accordance with the invention".

We have also found the novel basecoat material, especially aqueous basecoat material, comprising (A) as binder, or as one of the binders, at least one copolymer preparable by free-radical polymerization of a) at least one olefinically unsaturated monomer and b) at least one olefinically unsaturated monomer different than the olefinically unsaturated monomer (a) and of the general formula I

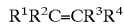
$$R^1R^2C=CR^3R^4 \qquad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, in an aqueous medium; and (B) at least one color and/or effect pigment.

In the text below, the novel basecoat material is referred to as the "basecoat material of the invention".

We have also found the novel process for producing a multicoat color and/or effect coating system ML on a primed or unprimed substrate by (I) preparing a basecoat film by applying a basecoat material to the substrate, (II) drying the basecoat film, (III) preparing a clearcoat film by applying a clearcoat material to the basecoat film, and (IV) jointly curing the basecoat film and the clearcoat film to give the basecoat BL and the clearcoat KL, or (I) preparing a surfacer film by applying a surfacer to the substrate, (II) curing the surfacer film to give the surfacer coat FL, (III) preparing a basecoat film by applying a basecoat material to the surfacer coat FL, (IV) drying the basecoat film, (V) preparing a clearcoat film by applying a clearcoat material to the basecoat film, and (VI) jointly curing the basecoat film and the clearcoat film to give the basecoat BL and the clearcoat KL, in which the basecoat material of the invention is used as basecoat material.

In the text below, the novel process for producing a multicoat color and/or effect coating system ML on a primed or unprimed substrate is referred to as the "process of the invention".

In the light of the prior art it was surprising that the object on which the present invention was based could be achieved by means of the use in accordance with the invent-on, the basecoat material of the invention, especially the aqueous basecoat material of the invention, and the process of the invention. A particular surprise was that the basecoats BL and multicoat systems ML of the invention have outstanding properties even at comparatively low baking temperatures. In particular, they are of outstanding optical quality, possess good intercoat adhesion and condensation resistance, and exhibit no cracking (mud cracking), flow defects or surface structures. A further surprise was that it is possible substantially or, if appropriate, completely to dispense with the use of thixotropic agents or Theological assistants in the basecoat materials used to produce pearlescent effects and/or dichroic effects.

In accordance with the invention, at least one copolymer (A) is used as the binder (A), or one of the binders (A), in the basecoat material of the invention.

In accordance with the invention, the copolymer (A) is prepared by free-radical polymerization of at least one olefinically unsaturated monomer (a) and at least one olefinically unsaturated monomer (b) which is different than the monomer (a).

Examples of suitable monomers (a) are a1) essentially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tert-butylcyclohexyl (meth)acrylate; (meth)acrylic oxaalkyl esters or oxacycloalkyl esters such as ethyltriglycol (meth)acrylate and methoxy-oligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth)

acrylate. For the purposes of the present invention, minor amounts of monomers of higher functionality in this case are to be understood as amounts which do not lead to crosslinking or gelling of the copolymers (A).

a2) Monomers which carry per molecule at least one hydroxyl group, amino group, alkoxymethylamino group or imino group and are essentially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethyl-aminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)-aminopropyl acrylate and methacrylate; monomers of this kind are used preferably to prepare selfcrosslinking constituents (A).

a3) Monomers which carry per molecule at least one acid group which can be converted to the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)-acryloyloxyethyl maleate, succinate or phthalate.

a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in a conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, especially Versatic® acids.

a5) Reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which is then reacted during or after the polymerization reaction with the glycidyl ester of an alpha-branched monocarboxylic acid having 5 to 18 carbon atoms per molecule, especially a Versatic® acid.

a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclo-pentadiene.

a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide. Monomers of the last-mentioned kind are used in particular to prepare selfcrosslinking binders (A).

a8) Monomers containing epoxide groups, such as the glycidyl ester of acrylic acid, methacrylic acid, ethacrylic acid, crotonic acid, maleic acid, fumaric acid and/or itaconic acid.

a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

a10) Nitriles such as acrylonitrile and/or methacrylonitrile.

a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinyl-imidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethyl-heptanoic acid.

a12) Allyl compounds, especially allyl ethers and allyl esters such as allyl methyl, ethyl, propyl or butyl ether or allyl acetate, propionate or butyrate.

a13) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A in columns 5 to 9, in DE 44 21 823 A1 or in International Patent Application WO 92/22615 A on page 12 line 18 to page 18 line 10.

a14) Acryloxysilane-containing vinyl monomers, preparable by reacting hydroxyl-functional silanes with epichlorohydrin and then reacting the reaction product with (meth)acrylic acid and/or with hydroxyalkyl and/or hydroxycycloalkyl esters of (meth)acrylic acid (cf. monomers a2).

Each of the abovementioned monomers (a1) to (a14) may be polymerized on their own with the monomers (b). In accordance with the invention, however, it is advantageous to use at least two monomers (a), since by this means it is possible to vary the profile of properties of the resulting copolymers (A) very widely, in a particularly advantageous manner, and to tailor said profile of properties to the particular intended use of the basecoat material. In particular, it is possible in this way to incorporate into the copolymers (A) functional groups by means of which the copolymers (A) become hydrophilic, so that they may be dissolved or dispersed in aqueous media. It is also possible to incorporate functional groups (afg) capable of entering into thermal crosslinking reactions with the complementary functional groups (cfg), described below, of any crosslinking agents (C) used. It is also possible to attach functional groups which give the copolymer (A) selfcrosslinking properties, such as N-methylol groups or N-alkoxymethyl groups.

In accordance with the invention, very particular advantages result if the monomers (a) used comprise the monomers (a1) and (a2) and also, if desired, (a3).

In accordance with the invention, the monomers (b) used comprise compounds of the general formula I.

In the general formula I, the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1,3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. The substituents used may comprise electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkyicycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclo-hexyl-N-methylamino and N-ethyl-N-methylamino.

Examples of monomers (b) whose use is particularly preferred in accordance with the invention are diphenylethylene, dinaphthaleneethylene, cis- or trans-stilbene, vinylidenebis(4-N,N-dimethylamino-benzene), vinylidenebis(4-aminobenzene), and vinyl-idenebis(4-nitrobenzene).

In accordance with the invention, the monomers (b) may be used individually or as a mixture of at least two monomers (b).

In terms of the reaction regime and the properties of the resultant copolymers (A), especially the acrylate copolymers (A), diphenylethylene is of very particular advantage and is therefore used with very particular preference in accordance with the invention.

The monomers (a) and (b) to be used in accordance with the invention are reacted with one another in the presence of at least one free-radical initiator to form the copolymer (A). Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azodinitriles such as azobisisobutyronitrile; C—C-cleaving initiators such as benzpinacol silyl ethers; or a combination of a nonoxidizing initiator with hydrogen peroxide.

It is preferred to add comparatively large amounts of free-radical initiator, the proportion of the initiator in the reaction mixture being, based in each case on the overall amount of the monomers (a) and of the initiator, with particular preference from 0.5 to 50% by weight, with very particular preference from 1 to 20% by weight, and in particular from 2 to 15% by weight.

Preferably, the weight ratio of initiator to the monomers (b) is from 4:1 to 1:4, with particular preference from 3:1 to 1:3, and in particular from 2:1 to 1:2. Further advantages result if the initiator is used in excess within the stated limits.

The free-radical copolymerization is preferably conducted in the apparatus mentioned at the outset, especially stirred vessels or Taylor reactors, the Taylor reactors being designed such that the conditions of Taylor flow are met over the entire reactor length, even if the kinematic viscosity of the reaction medium alters greatly, and in particular increases, owing to the copolymerization.

In accordance with the invention, the copolymerization is conducted in an aqueous medium.

The aqueous medium comprises essentially water. The aqueous medium may include minor amounts of the below-detailed crosslinking agents (C), reactive diluents (G), coatings additives (H) and/or organic solvents (I) and/or other dissolved solid, liquid or gaseous organic and/or inorganic substances of low and/or high molecular mass, especially surface-active substances, provided these do not adversely affect, or even inhibit, the copolymerization. In the context of the present invention, a "minor amount" is to be understood as an amount which does not remove the aqueous character of the aqueous medium.

Alternatively, the aqueous medium may comprise straight water.

The copolymerization is preferably conducted in the presence of at least one base. Particular preference is given to low molecular mass bases such as sodium hydroxide solution, potassium hydroxide solution, ammonia, diethanolamine, triethanolamine, mono-, di- and triethylamine, and/or dimethylethanolamine, especially ammonia and/or di- and/or triethanolamine.

The copolymerization is advantageously conducted at temperatures above room temperature and below the lowest decomposition temperature of the monomers used in each case, preference being given to a chosen temperature range of from 10 to 150° C., with very particular preference from 70 to 120° C., and in particular from 80 to 110° C.

When using particularly volatile monomers (a) and/or (b), the copolymerization may also be conducted under pressure, preferably under from 1.5 to 3000 bar, with particular preference from 5 to 1500 bar, and in particular from 10 to 1000 bar.

In terms of the molecular weight distributions, there are no restrictions whatsoever imposed on the constituent (A). Advantageously, however, the copolymerization is conducted so as to give a molecular weight distribution Mw/Mn, measured by gel permeation chromatography using polystyrene as standard, of $\leq 4$, with particular preference $\leq 2$, and in particular $\leq 1.5$, and in certain cases even $\leq 1.3$. The molecular weights of the constituents (A) may be controlled within wide limits by the choice of ratio of monomer (a) to monomer (b) to free-radical initiator. In this context, the amount of monomer (b) in particular determines the molecular weight, specifically such that the higher the proportion of monomer (b), the lower the resultant molecular weight.

The constituent (A) resulting from the copolymerization is obtained as a mixture with the aqueous medium, generally in the form of a dispersion. In this form it can be processed further directly or else used as a macroinitiator for further reaction with at least one further monomer (a) in a second stage (ii). The constituent (A) resulting in the first stage (i), however, may also be isolated as a solid and then reacted further.

The further reaction in accordance with the stage (ii) is preferably conducted under the standard conditions for a free-radical polymerization, it being possible for suitable solvents (H) and/or reactive diluents (F) to be present. Stages (i) and (ii) in the context of the process of the invention may be conducted separately from one another, both spatially and temporally. In addition, however, stages (i) and (ii) may also be carried out in succession in one reactor. For this purpose, the monomer (b) is first reacted with at least one monomer (a), completely or partially depending on the desired application and the desired properties, after which at least one further monomer (a) is added and the mixture is subjected to free-radical polymerization. In another embodiment, at least two monomers (a) are used from the start, the monomer (b) being first reacted with one of the at least two monomers (a) and then the resultant reaction product (A) being reacted, above a certain molecular weight, with the further monomer (a) as well.

Depending on reaction regime, it is possible in accordance with the invention to prepare endgroup-functionalized polymers, block, multiblock and gradient copolymers, star polymers, graft copolymers, and branched copolymers as constituents (A).

The copolymer (A) may include at least one, preferably at least two, functional groups (afg) which are able to enter into thermal crosslinking reactions with complementary functional groups (cfg) of the optionally used crosslinking agents (C) described below. The functional groups (afg) may be introduced into the constituent (A) by way of the monomers (a) or may be introduced following its synthesis, by means of polymer-analogous reactions.

Examples of suitable complementary reactive functional groups (afg) and (cfg) which enter into crosslinking reactions, for use in accordance with the invention, are summarized in the following overview. In the overview, the variable $R^5$ is substituted or unsubstituted alkyl, cycloalkyl, alkylcycloalkyl, cycloalkylalkyl, aryl, alkylaryl, cycloalkylaryl, arylalkyl or arylcycloalkyl radicals; the variables $R^6$ and $R^7$ are identical or different alkyl, cycloalkyl, alkylcycloalkyl or cycloalkylalkyl radicals, or are linked with one another to form an aliphatic or heteroaliphatic ring. Examples of suitable radicals of this kind are those listed above in connection with the radicals $R^1$, $R^2$, $R^3$ and $R^4$.

Overview: Examples of complementary functional groups (afg) and (cfg) in the
constituent (A) and crosslinking agent (C)
or
crosslinking agent (C) and constituent (A)

—SH
—NH$_2$
—OH
—O—(CO)—NH—(CO)—NH$_2$
—O—(CO)—NH$_2$

—C(O)—OH
—C(O)—O—C(O)—
—NCO
—NH—C(O)—OR$^5$
—CH$_2$—OH
—CH$_2$—O—CH$_3$
—NH—C(O)—CH(—C(O)OR$^5$)$_2$
—NH—C(O)—CH(—C(O)OR$^5$)(—C(O)—R$^5$)
—NH—C(O)—NR$^6$R$^7$
=Si(OR$^5$)$_2$

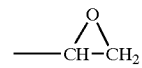

—C(O)—OH

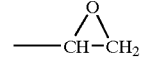

-continued

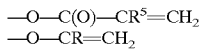   —OH
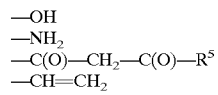   —NH$_2$
—C(O)—CH$_2$—C(O)—R$^5$
—CH=CH$_2$

The selection of the respective complementary groups (afg) and (cfg) is guided on the one hand by the consideration that, during storage, they should not enter into any unwanted reactions and/or should not disrupt or inhibit curing, if appropriate, with actinic radiation, and on the other hand by the temperature range within which thermal curing is to take place.

In this context, especially with regard to heat-sensitive substrates such as plastics, it is of advantage in accordance with the invention to choose a temperature range which does not exceed 100° C., and in particular does not exceed 80° C. In the light of these boundary conditions, complementary functional groups which have proven advantageous are hydroxyl groups and isocyanate groups, or carboxyl groups and epoxy groups, which are therefore employed with preference, in accordance with the invention, in the basecoat materials of the invention that are present as two-component or multi-component systems. Particular advantages result if the hydroxyl groups are used as functional groups (afg) and the isocyanate groups as functional groups (cfg).

If higher crosslinking temperatures, for example from 100° C. to 160° C., may be employed, which is preferred in accordance with the invention, suitable basecoat materials also include one-component systems, in which the functional groups (afg) are preferably thio, amino, hydroxyl, carbamate, allophanate, carboxyl and/or (meth)acrylate groups, but especially hydroxyl groups, and the functional groups (cfg) are preferably anhydride, carboxyl, epoxy, blocked isocyanate, urethane, methylol, methylol ether, siloxane, amino, hydroxyl and/or beta-hydroxyalkylamide groups.

The copolymer (A), and the basecoat material prepared with it, however, may also film without a crosslinking agent (C) and form an excellent basecoat. In this case, the copolymer (A) is physically curing. In the context of the present invention, physical curing and curing by way of the above-described complementary groups (afg) and (cfg) are both embraced by the generic term "thermal curing".

The proportion of the copolymer (A) for use in accordance with the invention in the novel basecoat material may vary very widely. Advantageously, the proportion is from 1 to 90, preferably from 2 to 80, with particular preference from 3 to 75, and in particular from 4 to 70% by weight, based on the overall solids content of the basecoat material of the invention.

The basecoat material of the invention may further comprise at least one customary and known binder (A) with at least one functional group (afg). Examples of suitable customary and known binders (A) are linear and/or branched and/or block, comb and/or random poly(meth)acrylates or acrylate copolymers, polyesters, alkyds, amino resins, polyurethanes, acrylated polyurethanes, acrylated polyesters, polylactones, polycarbonates, polyethers, epoxy resin-amine adducts, (meth)acrylate diols, partially hydrolyzed polyvinyl esters or polyureas, which contain said functional groups (afg). If used, their proportion in the basecoat material of the invention is preferably from 1 to 50, preferably from 2 to 40, with particular preference from 3 to 30, and in particular from 4 to 25% by weight, based in each case on the overall solids content of the basecoat material of the invention.

The basecoat material of the invention further comprises at least one color and/or effect pigment (B), in particular at least one color pigment and at least one effect pigment (B).

The color pigments (B) comprise organic or inorganic compounds.

Examples of suitable inorganic color pigments (B) are titanium dioxide, iron oxides, Sicotrans yellow and carbon black. Examples of suitable organic color pigments (B) are indanthrene blue, Cromophthal red, Irgazine orange, and Heliogen green.

Effect pigments (B) which can be used include metal flake pigments such as commercial aluminum bronzes, aluminum bronzes chromated in accordance with DE-A-36 36 183, and commercial stainless steel bronzes, and also nonmetallic effect pigments, such as pearlescent pigments or interference pigments, for example. Further examples of suitable effect pigments are given in Rompp Lexikon Lacke und Druckfarben, Georg Thieme Verlag, 1998, page 176.

Owing to this large number of suitable pigments (B) the basecoat material of the invention permits the realization of a particularly large number of hues and optical effects. This ensures a universal breadth of use and also very good adaptation of the basecoats BL and multicoat systems ML of the invention to the constantly changing and growing demands of the market.

The pigments (B) may also be incorporated into the basecoat materials of the invention by way of pigment pastes, suitable grinding resins comprising in particular the copolymers (A) described above.

The proportion of the pigments (B) for use in accordance with the invention in the basecoat material may vary very widely. Advantageously, the proportion is from 1 to 95, preferably from 2 to 90, with particular preference from 3 to 85, and in particular 4 to 80% by weight, based in each case on the overall solids content of the basecoat material of the invention.

The basecoat material may further comprise at least one crosslinking agent (C) which contains at least two, especially three, of the complementary functional groups (cfg) described in detail above.

Where the basecoat material comprises a two-component or multicomponent system, polyisocyanates and/or polyepoxides, but especially polyisocyanates, are used as crosslinking agents (C).

Examples of suitable polyisocyanates (C) are organic polyisocyanates, especially so-called paint polyisocyanates, having free isocyanate groups attached to aliphatic, cycloaliphatic, araliphatic and/or aromatic moieties. Preference is given to polyisocyanates having from 2 to 5 isocyanate groups per molecule and viscosities of from 100 to 10,000, preferably from 100 to 5000, and in particular from 100 to 2000 mPa.s (at 23° C.). If desired, small amounts of organic solvent (H), preferably from 1 to 25% by weight based on straight polyisocyanate, may be added to the polyisocyanates in order to make it easier to incorporate the isocyanate and, if appropriate, to reduce the viscosity of the polyisocyanate to a level within the abovementioned ranges. Examples of suitable solvent additives to the polyisocyanates are ethoxyethyl propionate, amyl methyl ketone, and butyl acetate. Furthermore, the polyisocyanates (C) may have been hydrophilically or hydrophobically modified in a customary and known manner.

Examples of suitable polyisocyanates (C) are described, for example, in "Methoden der organischen Chemie", Houben-Weyl, Volume 14/2, 4th Edition, Georg Thieme Verlag, Stuttgart, 1963, pages 61 to 70, and by W. Siefken, Liebigs Annalen der Chemie, Volume 562, pages 75 to 136.

Further examples of suitable polyisocyanates (C) are polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate, or 1,3-bis(isocyanatomethyl)cyclohexane (BIC), diisocyanates derived from dimeric fatty acids, as marketed under the commercial designation DDI 1410 by Henkel, 1,8-diisocyanato-4-isocyanatomethyloctane, 1,7-diisocyanato-4-isocyanatomethylheptane or 1-iso-cyanato-2-(3-isocyanatopropyl)cyclohexane, or mixtures of these polyisocyanates.

Examples of suitable polyepoxides (C) are all known aliphatic and/or cycloaliphatic and/or aromatic polyepoxides, examples being those based on bisphenol A or bisphenol F. Other suitable examples of polyepoxides are the polyepoxides available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

In the case of the one-component systems, the crosslinking agents (C) used react at relatively high temperatures with the functional groups (afg) of the binders (A) to build up a three-dimensional network. Of course, such crosslinking agents (C) may be used as well in the multicomponent systems, in minor amounts. In the context of the present invention, a "minor amount" is a fraction which does not disrupt, let alone prevent, the principal crosslinking reaction.

Examples of suitable crosslinking agents (C) of this kind are blocked polyisocyanates. Examples of suitable polyisocyanates for preparing the blocked polyisocyanates are those described above.

Examples of suitable blocking agents are the blocking agents known from U.S. Pat. No. 4,444,954, such as i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, ethylene glycol monopropyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mecaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidin-amide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline naphthylamine, butylamine, dibutylamine or butyl phenylamine;

ix) imidazoles such as imidazole or 2-ethylimidazole;

x) ureas such as urea, thiourea, ethyleneurea ethylenethiourea or 1,3-diphenylurea;

xi) carbamates such as phenyl N-phenylcarbamate 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles or triazoles; and also mixtures of these blocking agents, especially dimethylpyrazole and triazoles, malonic esters and acetoacetic esters or dimethylpyrazole and succinimide.

As crosslinking agent (C) it is also possible to use tris(alkoxycarbonylamino)triazines (TACT) of the general formula

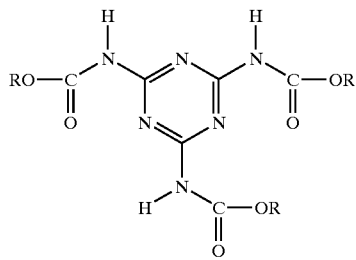

Examples of suitable tris (alkoxycarbonylamino)triazines (C) are described in patents U.S. Pat. No. 4,939,213, U.S. Pat. No. 5,084,541, and EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Further examples of suitable crosslinking agents (C) are amino resins, examples being melamine resins, guanamine resins, and urea resins. For further details, reference is made to Römp Lexikon Lacke und Druckfarben, Georg Thieme Verlag, 1998, page 29, "Amino resins", and the textbook "Lackadditive" [Coatings additives] by Johan Bieleman, Wiley-VCH, Weinheim, N.Y., 1998, pages 242 ff., or the book "Paints, Coatings and Solvents", second, completely revised edition, D. Stoye and W. Freitag (eds.), Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Further examples of suitable crosslinking agents (C) are beta-hydroxyalkylamides such as N,N,N',N'-tetrakis(2-hydroxyethyl)adipamide or N,N,N',N'-tetra-kis(2-hydroxypropyl)adipamide.

Further examples of suitable crosslinking agents (C) are siloxanes, especially siloxanes containing at least one trialkoxy- or dialkoxysilane group.

Further examples of suitable crosslinking agents (C) are polyanhydrides, especially polysuccinic anhydride.

Further examples of suitable crosslinking agents (C) are compounds containing on average at least two groups amenable to transesterification, examples being reaction products of malonic diesters and polyisocyanates or reaction products of monoisocyanates with esters and partial esters of malonic acid with polyhydric alcohols, as described in European Patent EP-A-0 596 460.

The amount of the crosslinking agents (C) in the clearcoat material may, where used, vary widely and is guided in particular, firstly, by the functionality of the crosslinking agents (C) and, secondly, by the number of crosslinking functional groups (afg) which are present in the binder (A), and also by the target crosslinking density. The skilled worker is therefore able to determine the amount of the crosslinking agents (C) on the basis of his or her general knowledge in the art, possibly with the aid of simple rangefinding experiments. Advantageously, the crosslinking agent (C) is present in the basecoat material of the invention in an amount of from 1 to 60, preferably from 2 to 50, with particular preference from 3 to 45, and in particular from 4 to 40% by weight, based in each case on the overall solids content of the basecoat material of the invention. It is further advisable here, in the case of its use, to choose the amounts of crosslinking agent (C) and binder (A) such that in the basecoat material the ratio of functional groups (cfg) in the crosslinking agent (C) to the functional groups (afg) in the binder (A) is from 2:1 to 1:2, preferably from 1.5:1 to 1:1.5, with particular preference from 1.2:1 to 1:1.2, and in particular from 1.1:1 to 1:1.1.

If the basecoat material of the invention is to be curable not only thermally but also with actinic radiation, especially UV radiation and/or electron beams (dual cure), it comprises at least one constituent (D) which is curable with actinic radiation. If, however, the basecoat material of the invention is to be curable predominantly (dual cure) or exclusively with actinic radiation, it must comprise a constituent (D).

Suitable constituents (D) are in principle all oligomeric and polymeric compounds that are curable with actinic radiation, especially UV radiation and/or electron beams, said compounds being commonly used in the field of UV curable or electron beam curable basecoat materials.

Radiation curable binders are used advantageously as constituents (D). Examples of suitable radiation curable binders (D) are (meth)acrylic-functional (meth)acrylic copolymers, polyether acrylates, polyester acrylates, unsaturated polyesters, epoxy acrylates, urethane acrylates, amino acrylates, melamine acrylates, silicone acrylates, isocyanato acrylates, and the corresponding methacrylates. It is preferred to use binders (D) that are free from aromatic structural units. Preference is therefore given to the use of urethane (meth)acrylates and/or polyester (meth)acrylates, with particular preference aliphatic urethane acrylates.

Where constituents (D) are used, they are present in the basecoat material in an amount of preferably from 1 to 60, more preferably from 1.5 to 50, with particular preference from 2 to 40, and in particular from 2.5 to 30% by weight, based in each case on the overall solids content of the basecoat material of the invention.

The basecoat material of the invention may further comprise at least one photoinitiator (E). If the basecoat material or the coats produced from it are to be crosslinked additionally with UV radiation in the context of the process of the invention, it is generally necessary to use a photoinitiator (E). Where used, it is present in the basecoat material of the invention in fractions of preferably from 0.01 to 10, more preferably from 0.1 to 8, and in particular from 0.5 to 6% by weight, based in each case on the overall solids content of the basecoat material of the invention.

Examples of suitable photoinitiators (E) are those of the Norrish II type, whose mechanism of action is based on an intramolecular variant of the hydrogen abstraction reactions as occur diversely in photochemical reactions (reference may be made here, by way of example, to Römpp Chemie Lexikon, 9th, expanded and revised edition, Georg Thieme Verlag, Stuttgart, Vol. 4, 1991) or cationic photoinitiators (reference may be made here, by way of example, to Römpp Lexikon Lacke und Druckfarben, Georg Thieme Verlag, Stuttgart, 1998, pages 444 to 446), especially benzophenones, benzoins or benzoin ethers, or phosphine oxides. It is also possible to use, for example, the products available commercially under the names Irgacure® 184, Irgacure® 1800 and Irgacure® 500 from Ciba Geigy, Grenocure® MBF from Rahn, and Lucirin® TPO from BASF AG.

In addition to the photoinitiators (E), use may be made of customary sensitizers (E) such as anthracene in effective amounts.

Furthermore, the basecoat material may comprise at least one thermal crosslinking initiator (F). At from 80 to 120° C., these initiators form free radicals which start the crosslinking reaction. Examples of thermally labile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles, or benzpinacol silyl ethers. Particular preference is given to C—C-cleaving initiators, since their thermal cleavage does not produce any gaseous decomposition products which might lead to defects in the coating film. Where used, their amounts are generally from 0.01 to 10, preferably from 0.05 to 8, and in particular from 0.1 to 5% by weight, based in each case on the basecoat material of the invention.

Moreover, the basecoat material may comprise at least one reactive diluent (G) curable thermally and/or with actinic radiation.

Examples of suitable thermally crosslinkable reactive diluents (G) are branched, cyclic and/or acyclic $C_9$–$C_{16}$ alkanes functionalized with at least two hydroxyl groups; preferably dialkyloctanediols, especially the positionally isomeric diethyloctanediols.

Further examples of suitable thermally crosslinkable reactive diluents (G) are oligomeric polyols obtainable from oligomeric intermediates themselves obtained by metathesis reactions from acyclic monoolefins and cyclic monoolefins, by hydroformylation and subsequent hydrogenation; examples of suitable cyclic monoolefins are cyclobutene, cyclopentene, cyclohexene, cyclo-octene, cycloheptene, norbornene or 7-oxanorbornene; examples of suitable acyclic monoolefins are present in hydrocarbon mixtures obtained in petroleum processing by cracking ($C_5$ cut); examples of suitable oligomeric polyols for use in accordance with the invention have a hydroxyl number (OHN) of from 200 to 450, a number-average molecular weight Mn of from 400 to 1000, and a mass-average molecular weight Mw of from 600 to 1100.

Further examples of suitable thermally crosslinkable reactive diluents (G) a re hyperbranched compounds containing a tetrafunctional central group, derived from ditrimethylolpropane, diglycerol, ditrimethylol-ethane, pentaerythritol, tetrakis (2-hydroxyethyl) methane, tetrakis (3-hydroxypropyl)methane or 2,2-bishydroxymethyl-1,4-butanediol (homopentaerythritol). These reactive diluents may be prepared in accordance with the customary and known methods of preparing hyperbranched and dendrimeric compounds. Suitable synthesis methods a re described, for example, in patents WO 93/17060 or WO 96/12754 or in the book by G. R. Newkome, C. N. Moorefield and F. V ögtle, "Dendritic Molecules, Concepts, Syntheses, Perspectives", VCH, Weinheim, N.Y., 1996.

Further examples of suitable reactive diluents (G) are polycarbonate diols, polyester polyols, poly(meth)acrylate diols, and hydroxyl-containing polyadducts.

Examples of suitable reactive solvents which may be used as reactive diluents (G) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate and 3-methyl-3-methoxybutanol, and also derivatives based on propylene glycol, e.g., isopropoxypropanol.

Examples of the active diluents (G) used that may be crosslinked with actinic radiation are polysiloxane macromonomers, (meth)acrylic acid and other esters thereof, maleic acid and its esters, including monoesters, vinyl acetate, vinyl ethers, vinylureas, and the like. Examples that may be mentioned include alkylene glycol di(meth)acrylate, polyethylene glycol di(meth)acrylate, 1,3-butanediol di(meth)acrylate, vinyl (meth)acrylate, allyl (meth)acrylate, glycerol tri(meth)acrylate, trimethylolpropane tri(meth)acrylate, trimethylolpropane di(meth)acrylate, tripropylene glycol diacrylate, styrene, vinyltoluene, divinylbenzene, pentaerythritol tri(meth)acrylate, pentaerythritol tetra(meth)acrylate, dipropylene glycol di(meth) acrylate, hexanediol di(meth)acrylate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethylacrylamide, and dicyclopentyl acrylate, and also the long-chain linear diacrylates described in EP-A-0 250 631 and having a molecular weight of from 400 to 4000, preferably from 600 to 2500. The acrylate groups may also, for example, be separated by a polyoxybutylene structure. Further candidates for use are 1,12-dodecyl diacrylate and the reaction product of 2 mol of acrylic acid with one mole of a dimeric fatty alcohol having generally 36 carbon atoms. Mixtures of the abovementioned monomers are also suitable.

Preferred for use as reactive diluents (G) are mono- and/or diacrylates, such as isobornyl acrylate, hexanediol diacrylate, tripropylene glycol diacrylate, Laromer® 8887 from BASF AG, and Actilane® 423 from Akcros Chemicals Ltd., GB. Particular preference is given to the use of isobornyl acrylate, hexanediol diacrylate, and tripropylene glycol diacrylate.

Where used, the reactive diluents (G) are employed in an amount of preferably from 1 to 70, with particular preference from 2 to 65, and in particular from 3 to 50% by weight, based in each case on the overall solids content of the basecoat material of the invention.

The basecoat material may comprise customary coatings additives (H) in effective amounts. Advantageously, the additives (H) are not volatile under the processing application conditions of the basecoat material of the invention.

Examples of suitable additives (H) are

UV absorbers;

free-radical scavengers;

crosslinking catalysts such as dibutyltin dilaurate or lithium decanoate;

slip additives;

polymerization inhibitors;

defoamers;

dryers;

antiskinning agents;

neutralizing agents such as ammonia or dimethylethanolamine;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids, and sulfo acids of alkoxylated alkanols, polyols, phenols and alkylphenols;

wetting agents such as siloxanes, fluorine compounds, carboxylic monoesters, phosphoric esters, polyacrylic acids and their copolymers, or polyurethanes;

adhesion promoters such as tricyclodecanedimethanol;

leveling agents;

film-forming auxiliaries such as cellulose derivatives;

fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details reference is made to Römpp Lexikon Lacke und Druckfarben, Georg Thieme Verlag, 1998, pages 250 ff., "Fillers";

rheology control additives such as those known from patents WO 94/22968, EP-A-0 276 501, EP-A-0 249 201 or WO 97/12945; crosslinked polymeric microparticles, such as disclosed, for example, in EP-A-0 008 127; inorganic phyllosilicates such as aluminum-magnesium silicates, sodium-magnesium and sodium-magnesium-fluorine-lithium phyllosilicates of the mont-morillonite type; silicas such as Aerosils; or synthetic polymers containing ionic and/or associative groups such as polyvinyl alcohol, poly (meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;

flame retardants; and/or biocides.

Further examples of suitable coatings additives (H) are described in the textbook "Lackadditive" by Johan Bieleman, Wiley-VCH, Weinheim, N.Y., 1998.

The basecoat material preferably comprises these additives (H) in amounts of up to 40, with particular preference up to 30, and in particular up to 20% by weight, based in each case on the overall solids content of the coating material.

Not least, the basecoat materials of the invention, especially in the case of nonaqueous basecoat materials, may comprise from 1 to 70, preferably from 2 to 60, and in particular from 3 to 50% by weight, based on the application-ready basecoat material of the invention, of water-miscible and water-immiscible organic solvents (I), such as aliphatic, aromatic and/or cycloaliphatic hydrocarbons such as toluene or methylcyclohexane or decalin; alkyl esters of acetic acid or propionic acid; alkanols such as ethanol; ketones such as methyl isobutyl ketone; glycol ethers; glycol ether esters and/or ethers such as tetrahydrofuran. In the context of the present invention it is also possible to use carbon dioxide as solvent (I).

The basecoat material of the invention may be present in different forms.

Thus, given an appropriate choice of its above-described constituents (A) and (B), and, if appropriate, of at least one of its constituents (A; customary and known binders), (C), (D), (E), (F), (G) and/or (H), it may be present in the form of a liquid basecoat material which is essentially free from organic solvents and/or water (100% system).

However, the basecoat material may also comprise a solution or dispersion of the above-described constituents in organic solvents (I) and/or water. It is a further advantage of the basecoat material of the invention that in this case it is possible to establish solids contents of up to more than 80% by weight, based on the basecoat material.

Moreover, given an appropriate choice of its above-described constituents, the basecoat material of the invention may be a powder coating material. For this purpose, the constituent (C) may have been microencapsulated if it is a polyisocyanate. This powder coating material may then, if desired, be dispersed in water, to give a powder slurry basecoat material.

The basecoat material of the invention may be a two-component or multicomponent system in which at least constituent (C) is stored separately from the other constituents and is not added to them until shortly before use. In this case, the basecoat material of the invention may also be aqueous, the constituent (C) preferably being present in a component comprising a solvent (I). This variant of the basecoat material of the invention is employed in particular for automotive refinishing.

Furthermore, the basecoat material of the invention may be part of a so-called mixer system or modular system, as described, for example, in patent DE-A-41 10 520, EP-A-0 608 773, EP-A-0 614 951, or EP-A-0 471 972.

Preferably, the basecoat material of the invention is in the form of an aqueous solution, a dispersion and/or an emulsion, in particular a dispersion, since in this case there is no need to isolate the copolymer (A) for use in accordance with the invention.

The preparation of the basecoat material of the invention from its constituents (A) and (B) and also, if appropriate, at least one of its constituents (A; customary and known binders), (C), (D), (E), (F), (G), (H) and/or (I) has no special features but instead takes place in a customary and known manner by mixing the constituents in appropriate mixing equipment such as stirred vessels, dissolvers or extruders in accordance with the techniques suitable for the preparation of the respective basecoat materials.

The basecoat material of the invention is used to produce the basecoat BL and multicoat system ML of the invention on primed or unprimed substrates.

Suitable coating substrates are fundamentally all surfaces which are undamaged by curing of the coatings present thereon using heat and, if appropriate, actinic radiation; examples are metals, plastics, wood, ceramic, stone, textile, fiber composites, leather, glass, glass fibers, glass wool, rock wool, mineral- and resin-bound building materials, such as plasterboard and cement slabs or roof tiles, and also assemblies of these materials.

Accordingly, the basecoat material of the invention is fundamentally also suitable for applications outside of automotive finishing, for example, in industrial coating, including coil coating and container coating. In the context of industrial coatings it is suitable for coating virtually all parts and articles for private or industrial use, such as radiators, domestic appliances, small metal parts, wheel hubs or rims. Furthermore, the basecoat material of the invention is also suitable for varnishing furniture.

In the case of electrically conductive substrates it is possible to use primers which are produced in a customary and known manner from electrodeposition coating materials. For this purpose, both anodic and cathodic electrodeposition coating materials are suitable, but especially cathodics.

Using the basecoat material of the invention it is also possible in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviated codes in accordance with DIN 7728P1). The plastics to be coated may of course also be polymer blends, modified plastics, or fiber reinforced plastics. It is also possible to employ the plastics commonly used in vehicle construction, especially motor vehicle construction. Unfunctionalized and/or nonpolar substrate surfaces may be subjected prior to coating in a known manner to a pretreatment, such as with a plasma or by flaming, or may be provided with a water-based primer.

The application of the basecoat material of the invention has no special features in terms of its method but instead may take place by any customary application method, such as spraying, knife coating, brushing, flow coating, dipping, or rolling. It is preferred to employ spray application methods, such as compressed air spraying, airless spraying, high-speed rotation, electrostatic spray application (ESTA), for example, alone or in conjunction with hot spray application such as hot air spraying, for example. Application may take place at temperatures of max. 70 to 80° C., so that appropriate application viscosities are attained without any change or damage to the basecoat material and its overspray (which may be intended for reprocessing) during the short period of thermal stress. For instance, hot spraying may be configured in such a way that the basecoat material is heated only very briefly in the spray nozzle or shortly before the spray nozzle.

The spray booth used for application may, for example, be operated with a circulation system, which may be temperature-controllable, and which is operated with an appropriate absorption medium for the overspray, an example of such medium being the basecoat material itself.

Where the basecoat material of the invention includes constituents (D) crosslinkable with actinic radiation, application is made under illumination with visible light with a wavelength of above 550 nm, or in the absence of light. By this means, material alteration or damage to the basecoat material and to the overspray is avoided.

In the context of the process of the invention, the application methods described above may be used to produce all coats FL and KL and also, if desired, further coats of the multicoat system ML of the invention.

In accordance with the invention, the basecoat film may be cured thermally and/or with actinic radiation in dependence on its material composition.

Curing may take place after a certain rest period. This period may have a duration of from 30 s to 2 h, preferably from 1 min to 1 h, and in particular from 1 min to 30 min. The rest period is used, for example, for leveling and devolatilization of the coating films or for the evaporation of volatile constituents such as solvents, water or carbon dioxide if the basecoat material has been applied using supercritical carbon dioxide as solvent (I). The rest period may be shortened and/or assisted by the application of elevated temperatures up to 80° C., provided this does not entail any damage or alteration to the coating films, such as premature complete crosslinking, for instance.

The thermal curing has no special features in terms of its method but instead takes place in accordance with the customary and known methods such as heating in a forced-air oven or irradiation with IR lamps. Thermal curing may also take place in stages. Advantageously, it is effected at a temperature of from 50 to 100° C., with particular preference from 80 to 100° C., and in particular from 90 to 100° C., for a period of from 1 min to 2 h, with particular preference from 2 min to 1 h, and in particular from 3 min to 30 min. Where the substrates used have a high capacity to withstand thermal stress, thermal crosslinking may also be conducted at temperatures above 100° C. In general it is advisable in this case not to exceed temperatures of 160° C., preferably 140° C., and in particular 130° C.

Given an appropriate material composition of the basecoat material, the thermal curing may be supplemented by curing with actinic radiation, it being possible to use UV radiation and/or electron beams. If desired, it may be supplemented by or conducted with actinic radiation from other radiation sources. In the case of electron beams, it is preferred to operate under an inert gas atmosphere. This may be ensured, for example, by supplying carbon dioxide and/or nitrogen directly to the surface of the coating film.

In the case of curing with UV radiation, as well, it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. The arrangement of these sources is known in principle and may be adapted to the circumstances of the workpiece and the process parameters. In the case of workpieces of complex shape such as automobile bodies, the regions not accessible to direct radiation (shadow regions) such as cavities, folds and other structural undercuts may be cured using point, small-area or all-round emitters, in conjunction with an automatic movement means for the irradiation of cavities or edges.

The equipment and conditions for these curing methods are described, for example, in R. Holmes, U. V. and E. B. Curing Formulations for Printing Inks, Coatings and Paints, SITA Technology, Academic Press, London, United Kingdom, 1984.

Curing may take place in stages, i.e., by multiple exposure to light or actinic radiation. This may also be done alternately, i.e., by curing in alternation with UV radiation and electron beams.

Where thermal curing and curing with actinic radiation are employed together (dual cure), these methods may be used simultaneously or in alternation. Where the two curing methods are used in alternation, it is possible, for example, to begin with thermal curing and end with actinic radiation curing. In other cases it may prove advantageous to begin and to end with actinic radiation curing. The skilled worker is able to determine the curing method particularly appropriate to each individual case on the basis of his or her general knowledge in the art, possibly with the aid of simple preliminary experiments.

In particular, the combination of thermal curing and curing with actinic radiation (dual cure) offers advantages, even with the basecoat materials of the invention having a very high pigment content, these advantages consisting in particular in the fact that, in their regions close to the substrate, the basecoat films cure predominantly by thermal means and additionally, in their surface regions, cure by radiation, so leading to basecoats BL having a particularly high surface quality.

In the context of the process of the invention, these curing methods may be used to produce all coats FL and KL and also, if desired, further coats of the multicoat system ML of the invention.

The resultant basecoats BL of the invention have a film thickness of from 5 to 50, preferably from 10 to 40, with particular preference from 12 to 30, and in particular from 15 to 25 $\mu$m.

The surfacer coats or antistonechip primers FL of the invention are the essential constituents of the multicoat system ML of the invention.

The multicoat systems ML of the invention may be produced in a variety of ways in accordance with the process of the invention.

In a first preferred variant, the process of the invention comprises the following steps:

(I) preparing a basecoat film by applying a basecoat material to the substrate, (II) drying the basecoat film, (III) preparing a clearcoat film by applying a clearcoat material to the basecoat film, and (IV) jointly curing the basecoat film and the clearcoat film to give the basecoat BL and the clearcoat KL (wet-on-wet technique).

A second preferred variant of the process of the invention comprises the steps of:

(I) preparing a surfacer film by applying a surfacer to the substrate, (II) curing the surfacer film to give the surfacer coat FL, (III) preparing a basecoat film by applying a basecoat material to the surfacer coat FL, (IV) drying the basecoat film, (V) preparing a clearcoat film by applying a clearcoat material to the basecoat film, and (VI) jointly curing the basecoat film and the clearcoat film to give the basecoat BL and the clearcoat KL (wet-on-wet technique).

Which of the preferred variants is chosen depends on the intended use of the multicoat systems ML of the invention. For instance, the second variant, in particular, is employed with particular preference in the context of automotive OEM finishing.

Aqueous coating materials used to produce surfacer coats comprise as binders, for example, water-soluble or -dispersible polyesters and/or polyurethanes. Aqueous coating materials of this kind are known from patent DE-A-43 37 961, DE-A-44 38 504, DE-C-41 42 816 or EP-A-0 427 028.

Suitable clearcoat materials for producing the clearcoat KL are all the customary and known one-component (1K), two component (2K) or multicomponent (3K, 4K) clearcoats, powder clearcoats, powder slurry clearcoats, and UV-curable clearcoats.

Examples of suitable known one-component (1K), two-component (2K) or multicomponent (3K, 4K) clearcoats are known from patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460, and WO 92/22615.

One-component (1K) clearcoat materials comprise, as is known, hydroxyl-containing binders and crosslinking agents such as blocked polyisocyanates, tris(alkoxycarbonylamino)triazines and/or amino resins. In another variant, they comprise as binders polymers containing pendant carbamate and/or allophanate groups, and carbamate- and/or allophanate-modified amino resins as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, and EP-A-0 594 142).

Two-component (2K) or multicomponent (3K, 4K) clearcoats comprise as essential constituents, as is known, hydroxyl-containing binders and polyisocyanates as crosslinking agents, which are stored separately prior to their use.

Examples of suitable powder clearcoats are known, for example, from German Patent DE-A-42 22 194 or from the product information sheet from BASF Lacke+Farben AG, "Pulverlacke" [Powder coatings], 1990.

Powder clearcoats comprise as essential constituents, as is known, binders containing epoxide groups, and polycarboxylic acids as crosslinking agents.

Examples of suitable powder slurry clearcoats are known, for example, from U.S. Pat. No. 4,268,542 and German Patent Applications DE-A-195 18 392.4 and DE-A-196 13 547 and are described in German Patent Application DE-A-198 14 471.7, unpublished at the priority date of the present specification.

Powder slurry clearcoats comprise, as is known, powder clearcoats in dispersion in an aqueous medium.

UV-curable clearcoats are disclosed, for example, in patents EP-A-0 540 884, EP-A-0 568 967, and U.S. Pat. No. 4,675,234.

Accordingly, the multicoat systems ML of the invention may have a different structure.

In a first preferred variant of the multicoat system ML of the invention, the following coats are situated above one another in the stated sequence:

(1) a surfacer coat FL which absorbs mechanical energy,
(2) the basecoat BL of the invention, and
(3) a clearcoat KL.

In a second preferred variant of the multicoat system ML of the invention, the following coats are situated above one another in the stated sequence:

(1) the basecoat BL of the invention, and
(2) a clearcoat KL.

In this case, the clearcoat KL may further be provided with a highly scratch-resistant coating such as, for example, an organically modified ceramic material.

In the process of the invention, the surfacer film and clearcoat film are applied in a wet film thickness such that their curing gives coats FL and KL having the film thicknesses which are advantageous and necessary for their functions. In the case of the surfacer coat FL, this thickness is from 10 to 150, preferably from 15 to 120, with particular preference from 20 to 100, and in particular from 25 to 90 $\mu$m, and in the case of the clearcoat BL it is from 10 to 100, preferably from 15 to 80, with particular preference from 20 to 70, and in articular from 25 to 60 $\mu$m.

The multicoat systems ML of the invention, owing to the particularly advantageous properties of the basecoats BL of the invention, have an outstanding profile of properties which is very well balanced in terms of mechanical properties, optical properties, corrosion resistance, and adhesion. Thus the multicoat systems ML of the invention have the intercoat adhesion and high optical quality which the market requires and no longer give rise to any problems such as inadequate condensation resistance, cracking (mud cracking) in the basecoats BL of the invention, or leveling defects or surface structures in the clearcoats KL. In particular, the multicoat system ML of the invention has an excellent metallic effect with a pronounced flop (strongly angle-dependent brightness and color differences), an outstanding D.O.I. (depth of image) and outstanding surface smoothness.

Not least, however, it proves to be a very particular advantage that by means of the basecoat material of the invention and of the process of the invention it is possible in a simple manner to produce a multicoat system ML which is based exclusively on aqueous coating materials and, if appropriate, on pulverulent basecoat materials.

EXAMPLES

Preparation Example 1

The Preparation of a Dispersion of a Copolymer (A)

A steel reactor as commonly used to prepare dispersions, equipped with a stirrer, a reflux condenser and 3 feed vessels, was charged with 52.563 parts by weight of DI water and this initial charge was heated to 90° C. The first feed vessel was charged with 10.182 parts by weight of acrylic acid, 18.345 parts by weight of methyl methacrylate and 1.493 parts by weight of diphenylethylene. The second feed vessel was charged with 9.914 parts by weight of 25 percent strength ammonia solution. The third feed vessel was charged with 5.25 parts by weight of DI water and 2.253 parts by weight of ammonium peroxodisulfate. With intensive stirring of the initial charge in the steel reactor, the three feed streams were commenced simultaneously. The first and second feed streams were metered in over the course of one hour. The third feed stream was metered in over the course of 1.25 hours. The resultant reaction mixture was held at 90° C. for 4 hours and then cooled to below 40° C. and filtered through a 100 $\mu$m GAF bag. The resultant dispersion had a solids content of from 32 to 34% by weight (1 hour, 130° C.)

and a free monomer content of less than 0.2% by weight (determined by gas chromatography).

The dispersion (A) was used to prepare a block copolymer (A).

Preparation Example 2

The Preparation of a Dispersion of a Block Copolymer (A)

A steel reactor as commonly used to prepare dispersions, equipped with a stirrer, a reflux condenser and a feed vessel, was charged with 51.617 parts by weight of DI water and 9.907 parts by weight of the dispersion from Example 1 and this initial charge was heated to 90° C. with stirring. Thereafter, a mixture of 9.856 parts by weight of n-butyl methacrylate, 7.884 parts by weight of styrene, 12.661 parts by weight of hydroxyethyl methacrylate and 8.885 parts by weight of ethylhexyl methacrylate was metered in from the feed vessel over the course of six hours. The resultant reaction mixture was stirred at 90° C. for two hours. Subsequently, the resultant dispersion was cooled to below 40° C. and filtered through a 50 μm GAF bag. The dispersion (A) had a solids content of from 41 to 42% by weight (1 hour, 130° C.) and a free monomer content of less than 0.2% by weight (determined by gas chromatography).

Example 1

1.2 The Preparation of an Inventive Metallic Basecoat Material 1.2.1 The Preparation of a Color Paste For the preparation of the metallic basecoat material, first of all a color paste was prepared from 50 parts by weight of the dispersion (A) from Preparation Example 2, 2 parts by weight of Pluriol® P900 (BASF AG), 43 parts by weight of Sicopalgelb® L1100 (BASF AG), 0.4 part by weight of Agitan® 281 (commercial defoamer; Munzing Chemie GmbH). The mixture was initially dispersed in a dissolver for ten minutes and then ground in a sand mill to a Hegmann fineness <5 μm. The viscosity of the resulting color paste was 424 mPas at a shear rate of 1000 s$^{-1}$ and 23° C.

For mixing with the metallic paste, 37.2 parts by weight of the color paste were admixed with 62.8 parts by weight of the dispersion (A) from Preparation Example 2 and also with 5 parts by weight of water.

1.2.2 The Preparation of a Thixotropic Agent

For the preparation of the metallic basecoat material, additionally, a thixotropic agent was prepared from 94 parts by weight of DI water, 3.0 parts by weight of Laponite® RD (Solvay Alkali GmbH) and Pluriol® P900 (BASF AG).

1.2.3 The Preparation of a Polyester Dispersion

For the preparation of the metallic basecoat material, additionally, a polyester was prepared in a customary and known manner from 23.23 parts by weight of dimer fatty acid (Pripol® 1009), 10.43 parts by weight of 1,6-hexanediol, 6.28 parts by weight of hexahydrophthalic anhydride, 9.9 parts by weight of neopentyl glycol and 10.43 parts by weight of trimellitic anhydride. One part by weight of cyclohexane was used as azeotrope former.

The resulting polyester was dispersed in 17.48 parts by weight of DI water, 18.9 parts by weight of butyl glycol and 2.25 parts by weight of dimethylethanolamine.

1.2.4 The Preparation of a Metallic Paste

For the preparation of the metallic basecoat material, a metallic paste was prepared from 378.7 parts by weight of the thixotropic agent from Example 1.2.1, 74 parts by weight of a commercial polyester (Maprenal® VM 3924), 70 parts by weight of butyl glycol, 334.5 parts by weight of the dispersion (A) from Preparation Example 2, 5 parts by weight of a commercial wetting agent (BYK® 346), 50.6 parts by weight of a commercial aluminum paste (Stapa Hydrolux® 8154), 86 parts by weight of the polyester from Example 1.2.3, and 33 parts by weight of DI water.

The pH of the metallic paste was adjusted to 7.8 using 10% strength dimethylethanolamine solution. The viscosity of the metallic paste was adjusted to 80 mPas by adding further water.

1.2.5 The Preparation of the Metallic Basecoat Material

The metallic basecoat material was prepared by mixing the color paste from Example 1.2.1 and the metallic paste from Example 1.2.4 in a weight ratio of 2:10.

Example 2

The Production of a Multicoat System ML of the Invention

The multicoat system ML of the invention was produced using customary and known steel test panels which have been coated with an electrodeposition coat produced from a standard commercial electrodeposition coating material and with a surfacer coat produced from a standard commercial surfacer.

The basecoat material of the invention from Example 1 was applied to the surfacer coat with the aid of a 100 μm box-type coating bar. The resulting basecoat film was initially dried at room temperature for 10 minutes and at 80° C. for 10 minutes and then coated with a commercial clearcoat material (FQ240016 from BASF Coatings AG) with the aid of the 100 μm box-type coating bar. Thereafter, the clearcoat film was initially dried at room temperature for 15 minutes, after which the clearcoat film and the basecoat film were baked together at 135° C. for 30 minutes.

The resulting multicoat system ML of the invention had an excellent profile of optical properties, in particular a pronounced flop.

What is claimed is:

1. A basecoat material comprising.
   (A) a binder comprising at least one copolymer prepared by free-radical polymerization of
      a) at least one olefinically unsaturated monomer and
      b) at least one olefinically unsaturated monomer different than the olefinically unsaturated monomer (a) and reperesented by formula I $$R^1R^2C\!\!=\!\!CR^3R^4 \qquad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloakylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals
      in an aqueous medium; and
   (B) at least one of a color pigment, an effect pigment, and a color and effect pigment.

2. The basecoat material of claim 1, wherein the copolymer
   (A) is obtained by
      (i) subjecting at least one monomer (a) and at least one monomer (b) to free-radical polymerization in an aqueous medium to provide a reaction product, and then
      (ii) reacting the resultant reaction product with at least one further monomer (a) under free-radical conditions.

3. The basecoat material of claim 2, wherein the aryl radicals $R^1$, $R^2$, $R^3$ and/or $R^4$ of the compound c) comprise phenyl or naphthyl radicals.

4. The basecoat material of claim 3, wherein the substituents in radicals $R^1$, $R^2$, $R^3$ and/or $R^4$ of the compound are b) electron-donating or electron-withdrawing atoms or organic radicals.

5. The basecoat material of claim 1, wherein monomers comprise at least one of a1) (meth)acrylic esters;

a2) monomers which carry per molecule at least one hydroxyl group, amino group, alkoxymethylamino group or imino group;

a3) monomers which carry per molecule at least one acid group which can be converted to the corresponding acid anion group;

a4) vinyl esters of alpha-branched monocarboxylic acids having 5 to 18 carbon atoms in the molecule;

a5) reaction products of acrylic acid and/or methacrylic acid with the glycidyl ester of an alpha-branched monocarboxylic acid having 5 to 18 carbon atoms per molecule;

a6) cyclic and/or acyclic olefins a7) (meth)acrylamides;

a8) monomers containing epoxide groups;

a9) vinylaromatic hydrocarbons;

a10) nitriles;

a11) vinyl compounds a12) allyl compounds a13) polysiloxane macromonomers having a number-average molecular weight Mn of from 1000 to 40,000 and having on average from 0.5 to 2.5 ethylenically unsaturated double bonds per molecule; and a14) acryloxysilane-containing vinyl monomers, prepared by reacting hydroxyl-functional silanes with epichlorohydrin and then reacting the reaction product with (meth)acrylic acid and/or hydroxyalkyl and/or hydroxycycloalkyl esters of (meth)acrylic acid.

6. The basecoat material of claim 1, herein the basecoat material further comprises at least one of:

A) at least one binder different than the copolymer (A);

C) at least one crosslinking agent,

D) at least one constituent which is crosslinkable with actinic radiation,

E) at least one photoinitiator,

F) at least one thermal crosslinking initiator,

G) at least one reactive diluent curable thermally and/or with actinic radiation, H) at least one coatings additive, and I) at least one organic solvent, wherein the at least one binder different than copolymer (A) contains at least one functional group (afg) that is able to undergo thermal crosslinking reactions with complementary functional groups (cfg) in the crosslinking agent (C), and the crosslinking agent contains at least two functional groups (afg) that are able to undergo thermal crosslinking reactions with complementary functional groups (cfg) in at least one of the binder and the at least one binder different than copolymer (A).

7. The basecoat material of claim 3, wherein the aryl radicals $R^1$, $R^2$, $R^3$ and/or $R^4$ of the compound comprise phenyl radicals.

8. The basecoat material of claim 4, wherein the substituents in radicals $R^1$, $R^2$, $R^3$ and/or $R^4$ of the compound are at least one of halogen atoms, nitrile, nitro, partially or fully halogenated alkyl, cycloalkyl, alkylcycloalkyl, cycloalkyalkyl, aryl, alkylaryl, cyclalkylaryl, arylalkyl and arylcycloalkyl radicals; aryloxy, alkyloxy and cycloalkyloxy radicals; arylthaio, alkylthio and cycloalkylthio radicals; hydroxyl groups and/or primary, secondary and/or tertiary amino groups.

* * * * *